United States Patent [19]

Griffin et al.

[11] Patent Number: 4,653,074
[45] Date of Patent: Mar. 24, 1987

[54] BIT SYNC GENERATOR

[75] Inventors: Dan M. Griffin, North Salt Lake; Clifford T. Johnson, Salt Lake City; Larry J. Miller, South Jordan, all of Utah

[73] Assignee: Sperry Corporation, Blue Bell, Pa.

[21] Appl. No.: 694,656

[22] Filed: Jan. 24, 1985

[51] Int. Cl.$^4$ .................. H04L 7/00; H03K 5/135
[52] U.S. Cl. .................................. 375/106; 375/110; 455/165; 358/195.1; 328/155
[58] Field of Search ............ 375/106, 119, 110, 120; 358/195.1; 328/155; 307/525, 526, 527, 528; 331/1 A, DIG. 2, 20; 455/165, 183

[56] References Cited

U.S. PATENT DOCUMENTS

| | | | |
|---|---|---|---|
| 3,983,498 | 9/1976 | Malek | 328/155 |
| 3,988,696 | 10/1976 | Sharpe | 375/120 |
| 4,109,283 | 8/1978 | Rast | 455/183 |
| 4,218,657 | 8/1980 | Rast | 455/183 |
| 4,405,947 | 9/1983 | Tults et al. | 358/195.1 |
| 4,426,734 | 1/1984 | Tults et al. | 455/183 |
| 4,451,850 | 5/1984 | Kamemoto | 455/183 |
| 4,461,035 | 7/1984 | Sakamoto | 455/165 |
| 4,574,243 | 3/1986 | Levine | 375/120 |

Primary Examiner—Robert L. Griffin
Assistant Examiner—M. H. Salotto
Attorney, Agent, or Firm—G. Donald Weber, Jr.; Glenn W. Bowen

[57] ABSTRACT

A system for synchronizing information bits to any frequency signal chain with low jitter correction and adapted for gate array implementation.

19 Claims, 11 Drawing Figures

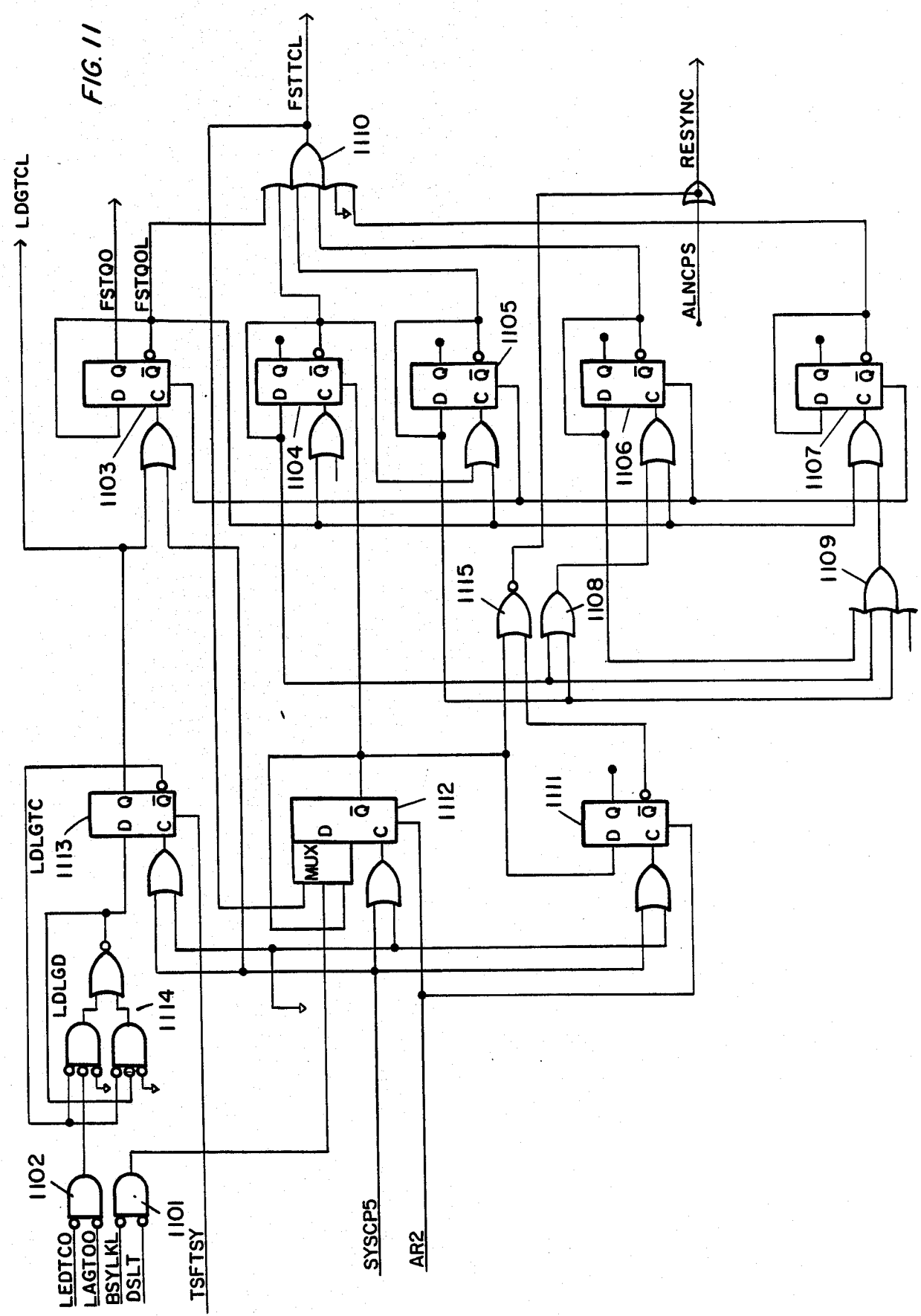

BIT SYNC GENERATOR

GOVERNMENT CONTRACT NOTICE

This invention was made with Government support under Contract No. F09604-84-C-001 awarded by the U.S. Air Force. The U.S. Government has certain rights in this invention.

BACKGROUND

1. Field of the Invention.

This invention relates to a circuit for synchronizing information bits to a wide range of frequencies, in general, and to a circuit for establishing a clock signal synchronization with low jitter, in particular.

2. Prior Art.

There are many synchronizing circuits known in the art. These circuits can be used to synchronize the operation of various circuits or circuit functions. In the context of the technology described herein, the prior art is, basically, a circuit that recovers a clock signal from digital data. The circuits described in the prior art, include, inter alia, a transition detector, a phase detector, an up-down counter, a variable divider and a window counter that, basically, measures how far the signal is from sync. However, the up-down counter has never been used in an existing design and the window counter has not been used in an existing implementation known to applicants. The prior art uses a variable divider network which determines when the incoming signals exhibit transitions from one state to another. The prior art circuit operates to divide down a reference signal to make it match the incoming signal. The window of the counter of the prior art system is set at half the clock frequency and counts the difference between the incoming signal and the transition. The prior art circuitry tries to correct this difference in a half-step-type jump to bring the signals into sync rapidly. The prior art system may include a counter referred to as a "K counter" to assure that the system does not correct too often and produce an undesirable "jitter" effect.

This type of sync circuit is especially useful in, for example, a data link where a signal, e.g. a video signal, is sent over an RF link. That is, the sync circuit recovers and converts the transmitted video signal to a specified base band. However, it is also necessary and/or desirable to recover a clock signal from the data transition so that the data can be clocked in and used as digital information.

The clock signal is necessary to sample the data. That is, a data link is frequently used in conjunction with a match filter which, essentially, integrates over the data time period to indicate that a data bit was a one or a zero (or an estimate of some range in between). In order to know what period is to be sampled, a clock signal is necessary and this clock signal is recovered from that data which is supplied. In other words, as part of the recovery of the data, and in order to determine exactly what kind of data it is, the clock signal must first be recovered out of that data.

Reference is made to U.S. Pat. No. 4,280,099, entitled DIGITAL TIMING RECOVERY SYSTEM, by G. D. Rattlingourd, and assigned to the common assignee. This patent describes a method and apparatus for performing digital data recovery. The patent also refers to the analog phase lock loop technique which is a common method of performing this sampling. The patent also describes some of the disadvantages and shortcomings of the analog approach as compared to the digital technique. In most prior art digital techniques, the circuit is designed to work on only one particular frequency. That is, data is supplied at a certain rate and an oscillator is selected which operates at a particular multiple of the data rate. Thereafter, the circuit is capable of recovering a clock signal for only a particular data rate signal. The basic method used to recover the clock from incoming video data is to start with a frequency about 100 times larger than the desired recovered clock signal, divide this frequency by 100, and then compare the transitions of the incoming video signal with the rising transition of the divided by 100 frequency. If the video signal transition is prior to the divided frequency transition, the "divide by" factor is changed from 100 to 99 for one period. This effectively, moves the divided frequency transition closer to the video input signal transition. This operation continues until the two transitions line up.

Conversely, if the video transition is subsequent to the divided frequency transition, the "divide-by" factor is changed to 101 for one period. This process is continued until the input signal transition lines up with the clock signal transition. At this point, the divided clock is the recovered clock for the input video data.

Thus, the prior art provides a system for effecting a synchronization which is subject to a relatively large "error" condition and with many limitations on the operation thereof.

SUMMARY OF THE INSTANT INVENTION

This invention is directed to a synchonizer circuit which produces synchronization of an input data signal with a system which operates upon said input data signal. The invention provides a means for monitoring when synchronization has occurred between a clock signal and an incoming signal (e.g. a video signal). The synchronization can be effected very rapidly as soon as incoming data signals are detected. Moreover, the clock signal can be recovered from a large number of different signal frequencies. Also, variable sizes of correction steps can be implemented in order to effect the speed of the recovery. That is, this arrangement permits more rapid recovery of the clock signal and, as well, can be tailored to accomodate drift in the incoming signal. In addition, the invention permits the utilization of multiple data rates for the system to lock onto.

BRIEF DESCRIPTION OF THE DRAWINGS

FIG. 11 is a block and logic diagram of the fast resynchronization circuit of the instant invention.

DESCRIPTION OF A PREFERRED EMBODIMENT

Figure 1:
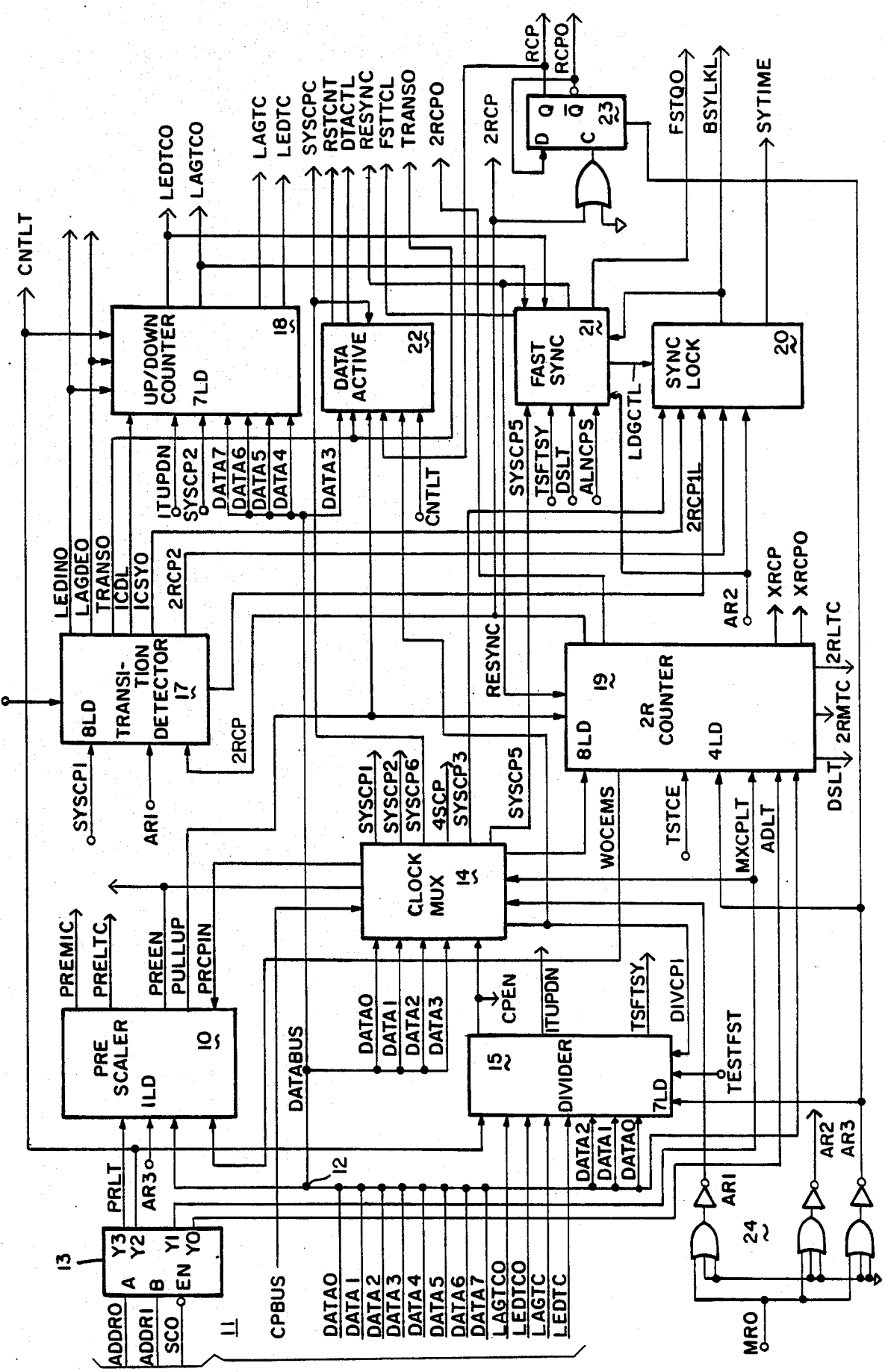
FIG. 1 is an overall block diagram of the bit sync circuit of the instant invention.

Referring now to FIG. 1, there is shown a block diagram of the bit sync circuit of the instant invention. This drawing includes a block for each sub-function of the circuit. A brief discussion of the function of each block is presented herewith. A detailed description of each functional block is presented infra. The pre-scaler circuit 10 operates upon an incoming clock provided by the clock mux 14. The pre-scaler divides down the incoming clock signal by a selectable factor between 2 and 257 to control the rest of the circuitry. The scaled clock signal is then provided back to the clock mux 14 for further routing. This operation allows the dynamic selection of the correction step size the rest of the circuit will have. It also permits ranges of frequencies at which other parts of the circuit can run.

The microprocessor address bus 11 is connected to the circuits shown in block form in FIG. 1 and is used to dynamically program the entire circuit. For example, to configure the pre-scaler 10 to divide by two, all logic ones are provided on the data bus 12 (which is part of the microprocessor bus 11). The decoder 13 is addressed so that the data on the data bus 12 is stored in latches in the pre-scaler 10 (see infra). When the pre-scaler 10 reaches its terminal count, the value stored in those latches is loaded into pre-scaler 10 to produce the divide-by frequency.

The master clock signals are supplied to the clock multiplexer 14 along the line called CPBUS. In one embodiment, the clock signal is supplied via gate array I/0 cells described hereinafter. In a preferred embodiment, there are four possible clocks that can be supplied to this device. The clocks are selectable by two control signals supplied on the microprocessor bus 11. The advantage is that four external oscillators of different frequencies can be utilized to provide more flexibility on the number of data rates to which the system can synchronize. Basically, any one of those four input clocks can be selected in the clock mux 14. The clock mux 14 can be configured to provide clock routing in four different ways (see infra). The clock routing, along with the ability to select a divide-by range in the pre-scaler 10, the 2R counter 19, and the divider 15 enables clock recovery from over 100,000 different video data rates.

The divider circuit 15 receives an input clock from the clock mux 14 which is derived from either the pre-scaler circuit 10 or one of the four external clock lines. The divider 15 can be programmed to divide by factors between 2 through 7. The divider receives lead signals (LEDTC and LEDTCO) and lag signals (LAGTC and LAGTCO) from the up/down counter 18. If a lead signal is received, the divider 15 divides by one less than the present divide value. Thus, for example, if the preset divide factor was 4 when a lead signal occurs, the divider will then divide by 3 instead of 4. This will speed up the clock by one input clock period and will cause the clock pulse 2RCP generated by the 2R counter 19 to align its rising transition with the incoming video data. This "lead condition" will occur if the input video signal occurs before the rising transition of the clock pulse 2RCP created by the 2R counter 19. In the same example, if the divider 15 receives a lag signal, it will then divide by 5 instead of 4. This "lag condition" will occur if the incoming video data transition occurs after the rising edge of the 2RCP pulse created by the 2R counter 19. If the divider is driven by the pre-scaler 10, then the correction step size is programmable for any one given input video signal. For example, if the pre-scaler was dividing by 16 and the 2R counter was dividing by 32, then the correction step size can be reduced by one half of its present value by changing the pre-scaler 10 divide number to 8 and the 2R counter to 64.

The video signal is supplied to the transition detector 17 which compares the video signal transitions with the 2RCP signal produced by the 2R counter 19. If the video signal transition is before the rising transition of the 2RCP (e.g. when the 2RCP is a logic 0), then a lead increment signal LEDIN is supplied to the up/down counter 18. If the video signal transition is after the rising transition of the 2RCP (e.g. when the 2RCP is a logic 1), then a lag decrement signal LAGDE is supplied to the up/down counter 18. The transition detector 17 has a TRANSO output which pulses low anytime the video signal has a transition thereon. This signal is sent to the data active circuit 22. When the video transition occurs within the same clock period as the rising transition of the 2RCP neither a lead incrementing nor a lag decrement signal is produced. To indicate this condition, an ICSDO signal is produced by the transition detector 17 and supplied to the sync lock circuit 20.

The up/down counter 18 provides a way of averaging the lead and lag pulses received from the transition detector 17. The up/down counter is initialized at mid range. When a lead pulse is received, the counter is incremented. When a lag pulse is received the counter is decremented. When the counter reaches a preselected value of between +1 and +15 above mid range, a lead terminal count (LEDTC) will be generated. When the counter reaches a preselected value of between −2 and −16 below mid range, a lag terminal count (LAGTCO) will be generated. The LEDTCO and LAGTCO signals are supplied to the divider 15 which uses these signals to either delete a clock pulse or insert an extra clock pulse. The divider 15 also resets the up/down counter 18 to the mid range value after receiving either a LEDTCO or a LAGTCO signal. Programming of the preselected value for the up/down counter 18 to produce the LEDTCO and LAGTCO pulse is accomplished over the microprocessor bus 11.

The 2R counter circuit 19, under program control, receives a clock signal via the clock mux 14 from either the divider circuit 15 or the pre-scaler circuit 10. The 2R counter 19 divides the received clock by a programmed value between 4 and 514. The divide resolution is limited to even numbers which allows the output clock called 2RCP to have a 50% duty cycle. The 50% duty cycle is desired for proper operation of the transition detector circuit 17. The programmed value is controlled over the microprocessor bus 11. The 2R counter can also be configured into an XR mode of operation. In this mode the 2R counter can produce a 50% duty cycle synchronous clock which is 2 to 16 times higher than the 2RCP. Again, the rate is programmable over the microprocessor bus 11.

The function of the sync lock circuit 20 is to determine when the system has achieved sync lock. Sync lock is defined as the alignment of the rising edge of the 2RCP with a video transition. The sync lock circuit has a confidence counter built into it that allows an occasional video transition away from the rising edge of the 2RCP without indicating an "out of bit sync lock" condition. The sync lock status is output to the system as a status signal and is also supplied to the fast sync circuit 21.

The fast sync circuit 21 provides a technique to achieve almost immediate bit sync lock. This is accomplished by causing the 2R counter 19 to be preloaded when a video transition occurs. The preloading of the 2R counter aligns, within 8 clock pulses, the rising edge of the 2RCP with the video transition. After the fast sync circuit has caused a resync function, it waits for 32 lead or lag terminal counts from up/down counter 18 before issuing another resync signal to the 2R counter. If sync lock is achieved before the 32 terminal counts occur no resync signal is generated. The fast sync function can be enabled or disabled over the microprocessor bus 11. Without the fast sync function, it would take over 600 video transitions on the average to achieve bit sync lock.

The data active circuit 22 provides a means of monitoring the incoming video signal for data activity. As long as video transitions occur within 64 data clock times, the data activity circuit will produce a data active signal (DTACTL).

The flip-flop 23 receives the 2RCP signal and creates an R clock signal (RCP) which is half the frequency of the incoming video signal. The master reset signal MRO is supplied to buffers 24 which provide initialization pulses to all of the circuitry in the bit sync generator gate array.

The input and output (I/O) circuits are gate array cells as noted above. Typically, the input cells are used to translate from external TTL signal levels and external 5-volt-referenced ECL signal levels to voltage levels used inside the gate array. The output cells translate from internal gate array voltage levels to external TTL or 5 volt referenced ECL signal levels. The ECL inputs and outputs are used for signals, typically, operating above 30 MHZ.

Figure 2:
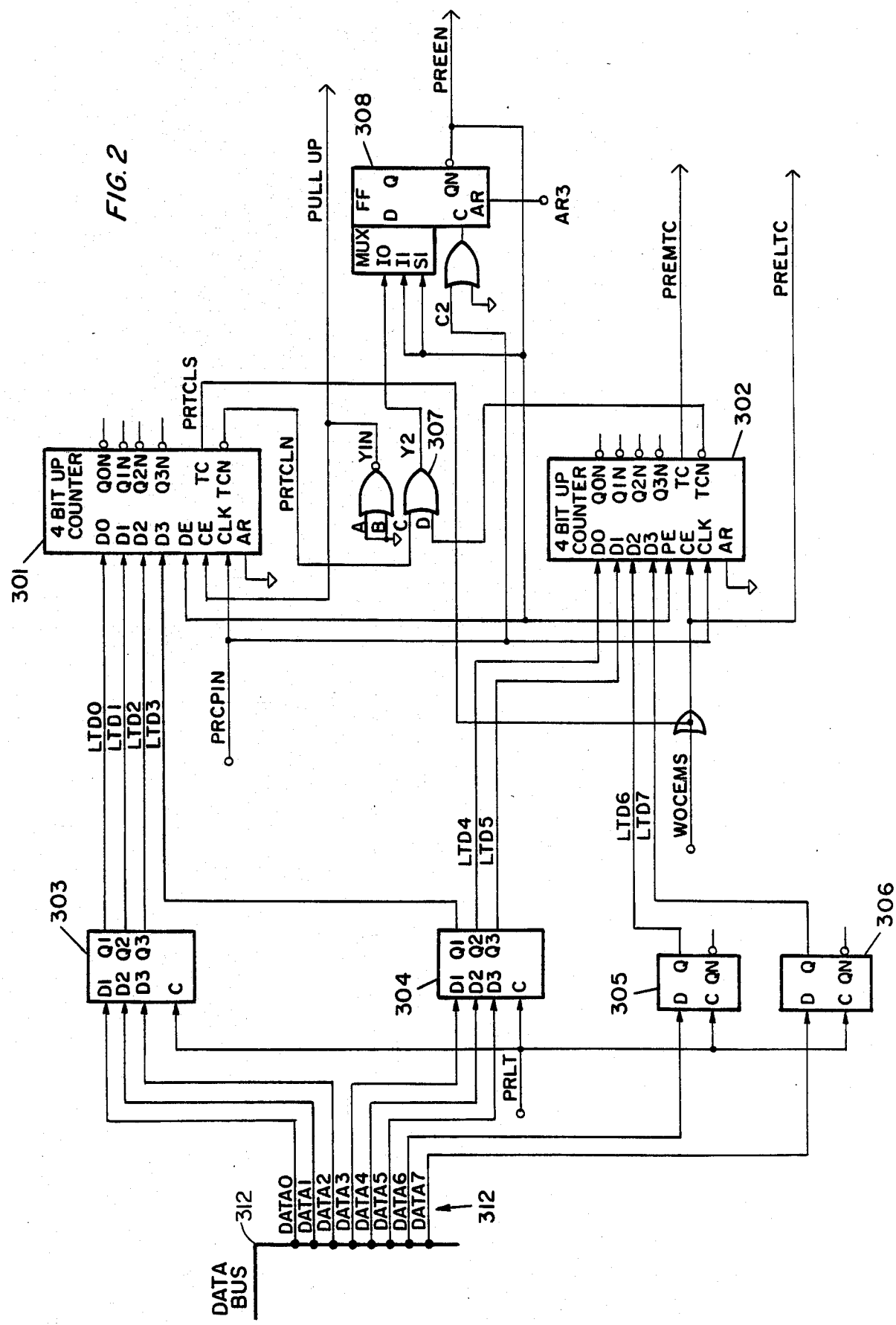
FIG. 2 is a block and logic diagram of the pre-scaler circuit of the instant invention.

Referring now to FIG. 2, there is shown a logic block diagram of the pre-scaler 10 shown in FIG. 1. The pre-scaler includes two 4-bit counters 301 and 302 which are of standard design. Latches 303 through 306 are connected to the microprocessor data bus 312 and latch in a value which determines the pre-scaler "divide-by" factor. The OR gate 307 triggers the preloading of the counters 301 and 302 in response to attaining terminal count on both of these counters, as represented by the signals TCN. This condition indicates the need to preload. Flip-flop 308 operates to pipeline this terminal count condition so that the circuitry will run faster than it is normally capable of doing.

Figure 3:
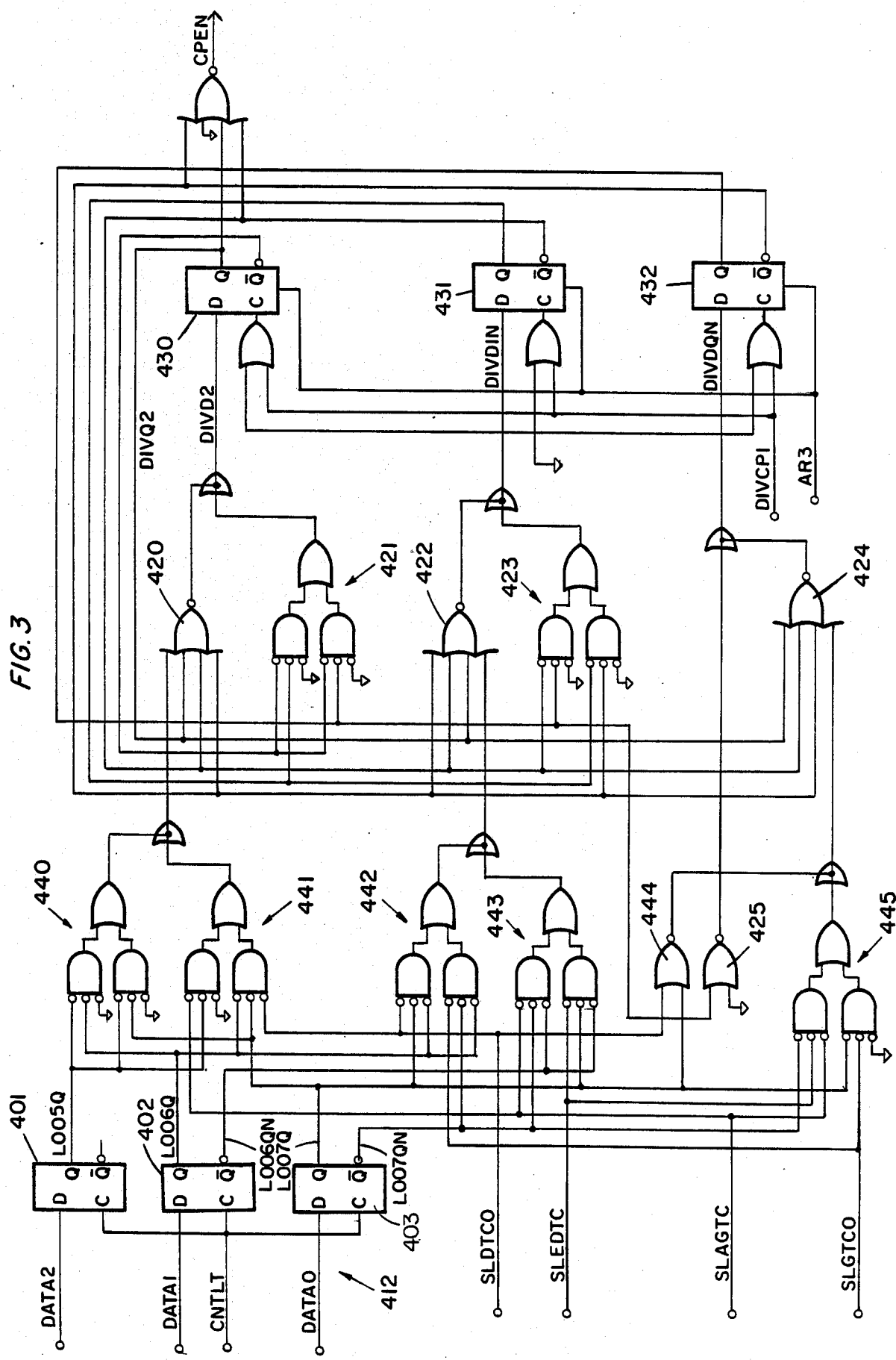
FIGS. 3 and 4 are block and logic diagrams of the clock control divider circuits of the instant invention.
Figure 4:
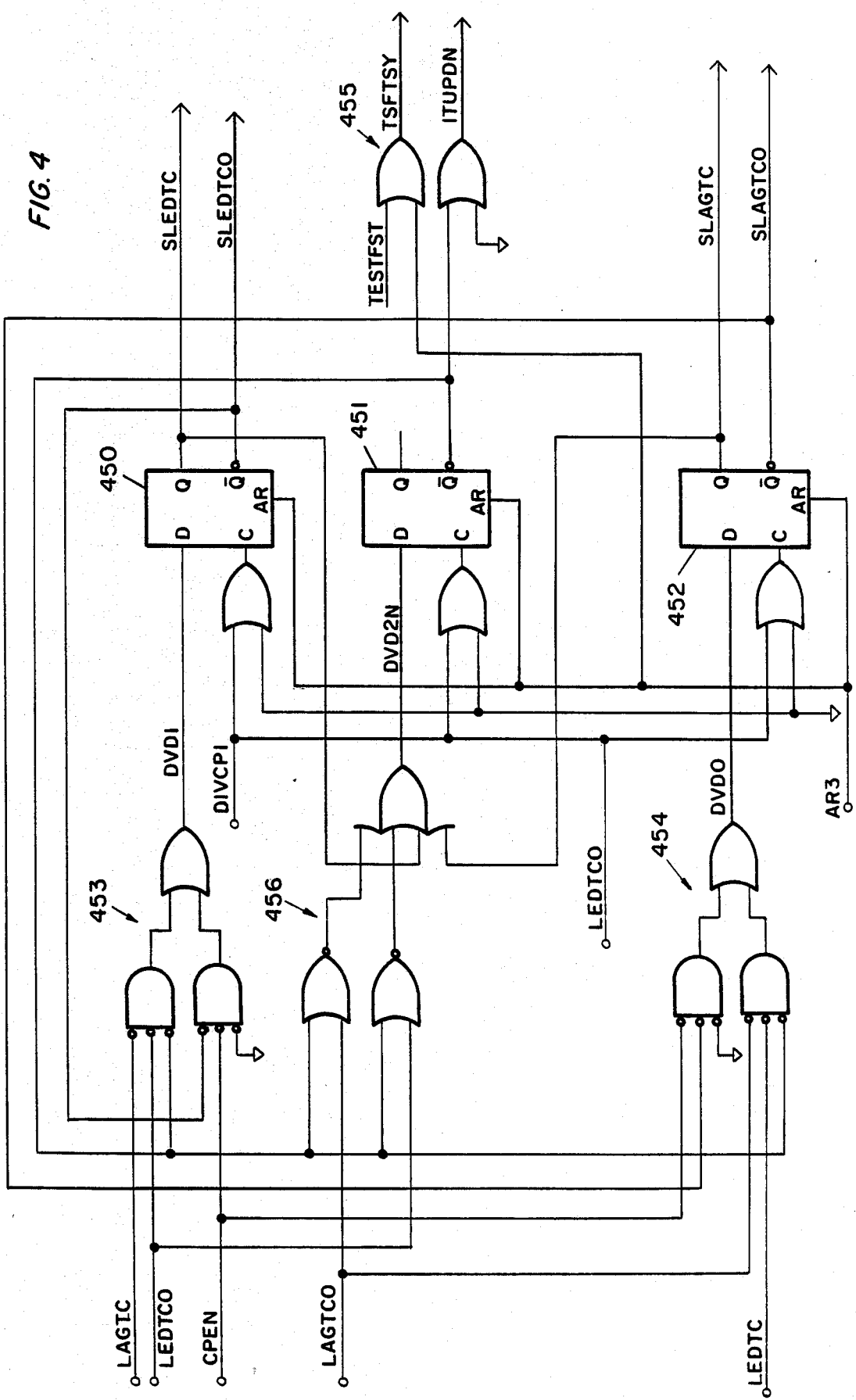

Referring now to FIGS. 3 and 4, there is shown a logic block diagram of the divider circuitry 15 shown in FIG. 1. The data bus 412 (which may be part of bus 12 or bus 312 previously described) is used to preload into latches 401, 402 and 403, the value-plus-one by which the divider is to divide. The divider consists of flip-flops 430 through 432 and combinational logic components 420 through 425. The divider operates as a down counter. For example, if latches 401-403 are loaded with a "6", the down counter (circuitry components 420-425, 430-432) will count 6, 5, 4, 3, 2, 1, 0. When flip-flops 430-432 all reach zero, the output signal CPEN goes to a logic high. This output is supplied to the clock mux 14 and is used to enable clock pulses for other system uses. Combinational logic circuitry 440 through 445 modifies the preload value stored in latches 401-403 by either minus one (−1) or plus one (+1). This modification occurs only if a lead terminal count (SLEDTC) or a lag terminal count (SLAGTC) condition, respectively, is present. Thus, if the preload latches 401-403 were set at "6" and a SLEDTC condition is present, then for one countdown period the down counter would start at 5 (6−1) instead of 6. Conversely, if a SLAGTC condition is present then, for one period only, the down counter would start at 7 (6+1) instead of 6. This function causes the CPEN signal to occur one period sooner or later than normal. Moreover, this function is the feature that eventually causes the entire circuit to synchronize to the incoming video transitions. (Note that a "0" appended to a signal name, e.g. SLEDTC and SLEDTCO, denotes the complement of the named signal.)

The divide circuitry portion shown in FIG. 4 is used to capture the lead (LEDTC) and lag terminal count (LAGTC) from the up-down counter 18 (see FIG. 1) and retain one of these signals until the down counter of FIG. 3 has acted upon the signal because the divider circuitry is clocked with a higher speed clock than was the up/down counter 18 which generates the LAGTC and LEDTC signals. Flip-flops 450, 451 and 452 provide a means of storing whether a lead or a lag terminal count condition has occurred so that the divider can operate thereon before the signal goes away. Also, when running at high speeds, it is possible for a lead or a lag terminal count condition to occur and for the next such signal to occur immediately thereafter. In this case only the first occurring signal is wanted. The circuitry shown in FIG. 4 performs that function, as well. The first signal that comes along, whether it be a lead or a lag terminal count, is latched in until the divider has either subtracted or added a clock pulse to the signal. Once the divider action is completed, the clock pulse enable signal (CPEN) feeds back to the gate networks 453 and 454 in FIG. 4 whereby these gates are enabled to accept new lead and lag condition signals from up/down counter 18. Flip-flop 451 is set when either a lag or lead terminal count is received on the divider input. The high going $\overline{Q}$ signal is buffered by gate 455 as the signal ITUPDN and resets the up/down counter 18 to its mid-range value. The gate networks 453 and 454 are typical AND/OR gate logic cells.

Figure 5:
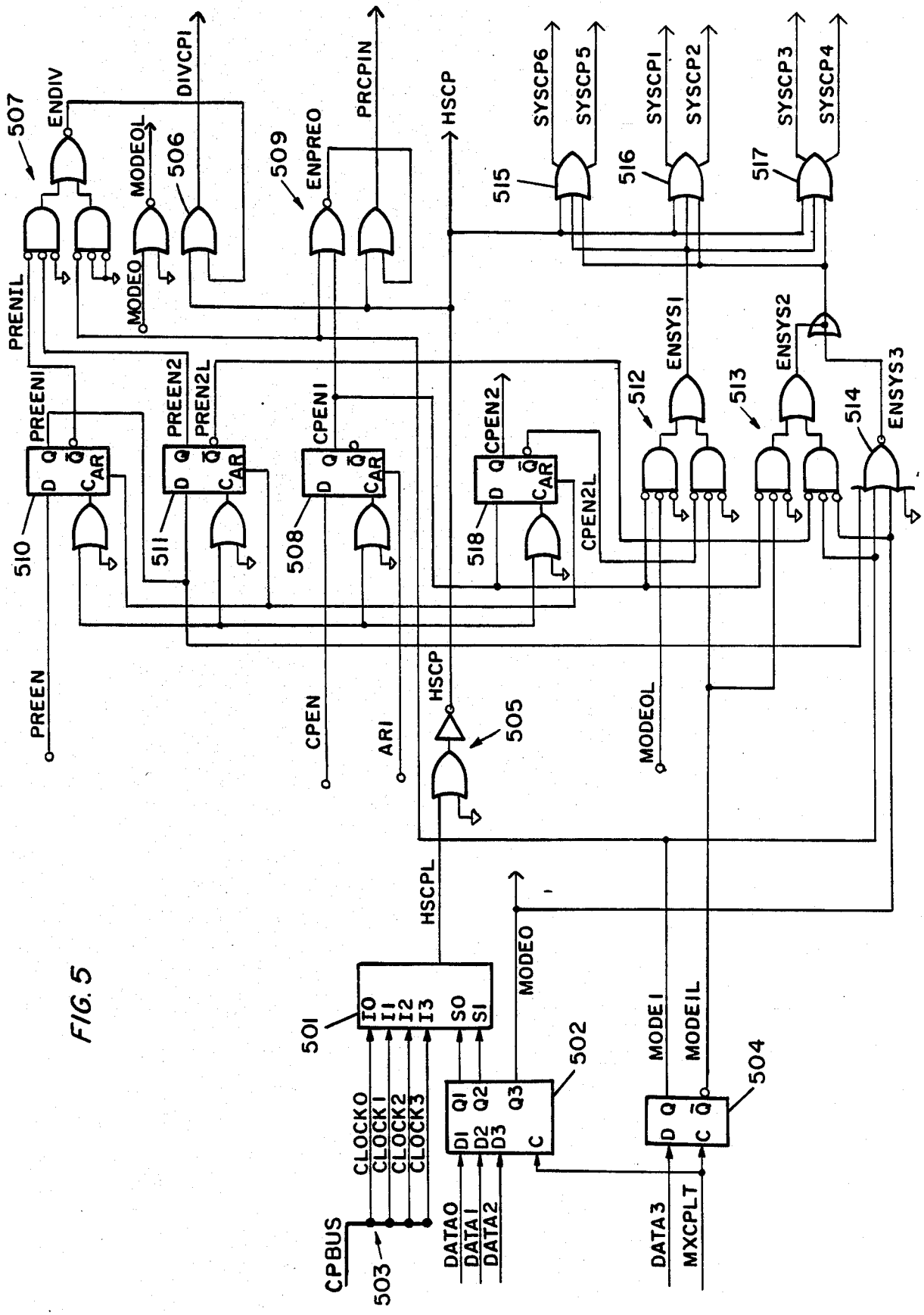
FIG. 5 is a block and logic diagram of the clock multiplexer circuit of the instant invention.

Referring now to FIG. 5, there is shown a logic diagram of the clock mux 14 used in this invention and described supra. The four-to-one multiplexer 501 selects, via control from latch 502, one of four external clock signals received on clock bus 503. The four clock signals are supplied via input buffers of the type described above. In this embodiment, two of the clocks are TTL and two are 5 volt referenced ECL. The output from mux 501 clocks the rest of the clock mux 14 which in turn clocks the entire bit sync gate array. There are three possible clocking modes provided for in the clock mux. These modes are controlled by latches 502 and 504. The inputs to these latches are connected to the microprocessor bus 11 as shown in FIG. 1.

The three modes of clock routing are described below:

(1) Mode 0. One of the four input clocks drives the divider circuit 15. The divider output then drives the pre-scaler 10. The pre-scaler output then drives circuits 17 through 21 (see FIG. 1).

(2) Mode 1. One of the four input clocks drives the divider circuit 15. The divider output then drives the circuits 17 through 21.

(3) Mode 2. One of the four input clocks drives the pre-scaler 10. The output of the pre-scaler then drives the divider circuit 15. The divider output then drives circuits 17 through 21.

In Mode 0, three clock routing functions occur.

(1) Clock Routing Function 0-1. One of the four input clocks received from mux 501 is buffered by buffer 505 and routed through OR gate 506 to provide the divider circuit 15 with a clock signal. The mode control from latch 504 causes the output of gate 507 to be continuously high, thus causing DIVCPI from OR gate 506 to follow the selected input clock signal period-for-period.

(2) Clock Routing Function 0-2. When the divider circuit 15 reaches zero, it generates a CPEN signal. This signal is pipelined for speed considerations by flip-flop 508. This output gates on the selected input clock (HSCP) to produce the PRCPIN (the pre-scaler 10 circuit clock) via NOR OR gates 509. Thus, the pre-scaler 10 receives one input clock only when the divider reaches a count of zero and produces a CPEN signal.

(3) Clock Routing Function 0-3. The output of the pre-scaler circuit 10 produces a signal called PREEN when it reaches its terminal count position. This signal is buffered by flip-flops 510 and 511. The outputs of these flip-flops are fed, with mode control, into combinational logic 512, 513 and 514 the output of which is ORed together by gates 515, 516 and 517 to produce six identical gated clocks. This clock is gated on for only one period of the HSCP, in particular, during the first HSCP period of the PREEN signal. The six identical clocks drive blocks 17 through 21 of FIG. 1. More than one clock is used to avoid overloading any signal clock line.

In Mode 1 two clock routing functions occur.

(1) Clock Routing Function 1-1. The first clock routing is identical to Clock Routing Function 0-1 as described under Mode 0 operation.

(2) Clock Routing Function 1-2. When the divider circuit 15 reaches zero, it generates a CPEN signal. This signal is pipelined for speed considerations by flip-flop 508. The output of this flip-flop is fed, with mode control, into combinational logic 513 which enables gates 515, 516, and 517 to produce six identical gated clocks. This clock is gated on for only one period of the HSCP, in particular during the time period when the CPEN signal is high. The six identical clocks again drive blocks 17-21.

In Mode 2 three clock routing functions occurs as described below.

(1) Clock Routing Function 2-1. One of the four input clocks is selected to continuously drive the clock PRCPIN. The mode control from latch 504 ensures that the output of NOR gate 509 is always low. Thus, the clock for the pre-scaler 10 matches the HSCP period for period.

(2) Clock Routing Function 2-2. The output of the pre-scaler 10 called PREEN is buffered by flip-flop 510 and 511. These flip-flop outputs, along with mode control, drive combinational logic 507 and 506 which produce one clock pulse to the divider circuit 15 during the first HSCP period after PREEN goes high.

(3) Clock Routing Function 2-3. When it reaches zero, the output of the divider circuit 15 produces a CPEN signal which is buffered by flip-flops 508 and 518. The outputs of these flip-flops along with mode control, feed gate 512 which enables gates 515-517 to produce six identical clocks. This clock is gated on for only the first HSCP period after the CPEN signal goes high. The six identical clocks drive blocks 17 through 21.

Figure 6:
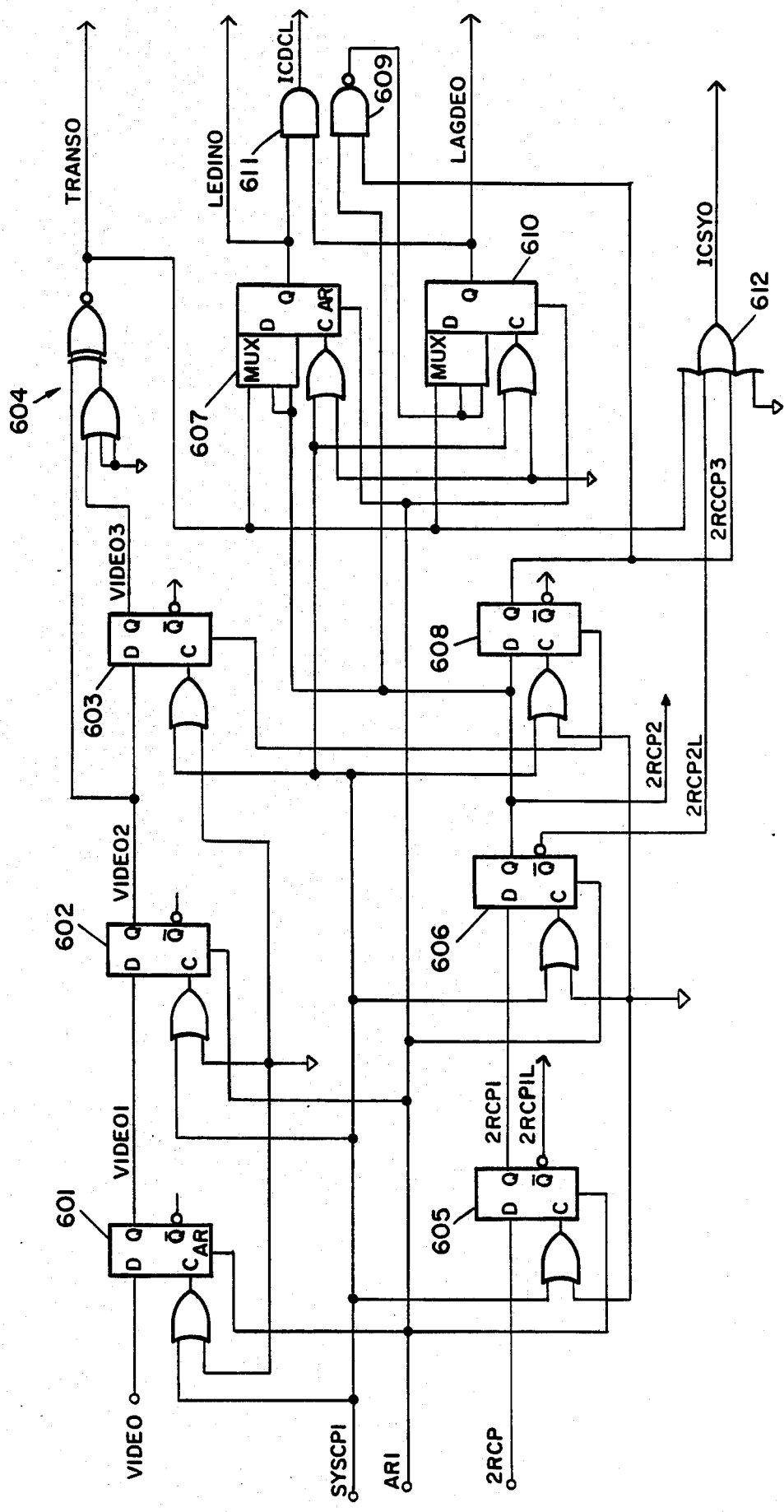
FIG. 6 is a block and logic diagram of the data transition detector circuit of the instant invention.

Referring to FIG. 6, there is shown a logic block diagram of the transition detector. The VIDEO signal is introduced to the circuit and is clocked by two flip-flops 601 and 602 before anything else is done to it in order to eliminate a pseudo-stable condition. A pseudo-stable output from flip-flop 601 is possible if the input VIDEO signal changed during the set-up or hold time of the flip-flop 601. Since flip-flop 602 clocks the output of flip-flop 601 one clock period later, the pseudo-stable condition has one complete clock period to reach a stable high or low state. Thus, the probability of the input to flip-flop 602 being unstable during its set-up and hold time is extremely small and, in practice, is more than a days time if ever. The output of flip-flop 602 is supplied to flip-flop 603 and Exclusive OR gate 604. The output of gate 604 produces a pulse any time there is a data transition on the output of flip-flop 602. This indicates that the VIDEO signal received into the gate array has changed states. The clock 2RCP received from the 2R counter 19 is input to flip-flops 605 and 606. The delay through these two flip-flops ensures that the 2RCP has the same delay as the VIDEO signal.

This feature ensures that the positive transition of the clock 2RCP going out of the gate array occurs in the same clock period as the VIDEO transition. Mux flip-flop 607 monitors the video transition produced by gate 604 and the low period of the clock 2RCP as output by flip-flop 606. If a transition occurs during the low time of the clock 2RCP, the circuit produces a lead increment pulse (LEDINO) which causes the up/down counter 18 to count up. Flip-flop 608 delays the 2RCP output of flip-flop 606. Then NAND gate 609 produces a low signal during the high time of the 2RCP less the first 2RCP high time period. Mux flip-flop 610 monitors the VIDEO transition from gate 604 during the low signal time of NAND gate 609. Flip-flop 610 produces a lag decrement (LAGDEO) signal if a VIDEO transition occurs during this time period and thereby causes the up/down counter 18 to count down one state. AND gate 611 produces a pulse if either a LAGDEO or LEDINO signal is produced and is also used to make the up/down counter operate properly. It should be noted that there is no increment or decrement signal produced if the VIDEO transition occurs during the first clock period of the high time of the clock 2RCP. If the VIDEO transition occurs during this period, the bit sync circuit is in synchronization and no correction or related action is taken. Gate 612 monitors this in sync alignment and produces a pulse called ICSYO when this occurs.

Figure 7:
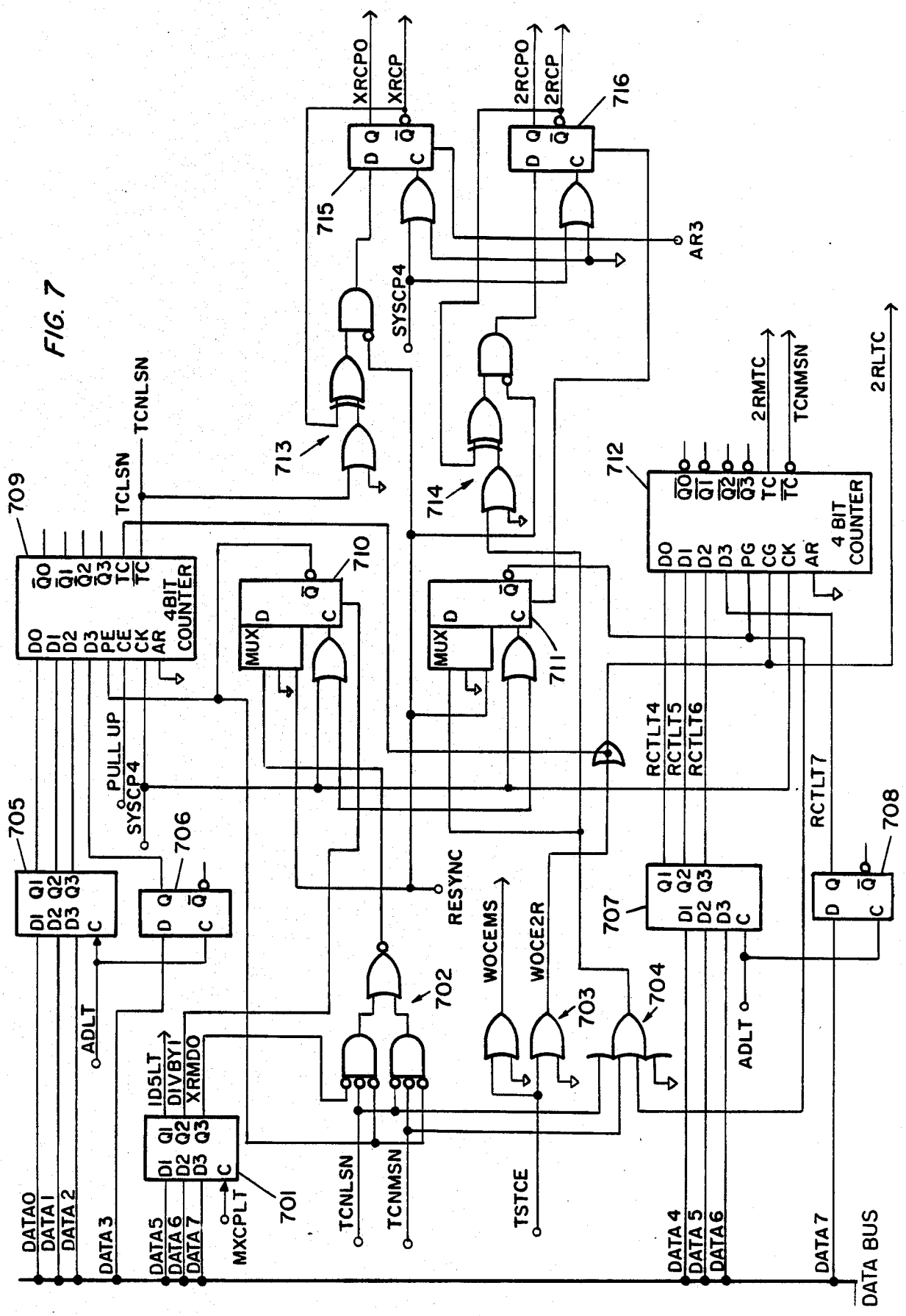
FIG. 7 is a block and logic diagram of the 2R counter divider circuit of the instant invention.

Referring now to FIG. 7 there is shown a logic block diagram of the 2R counter. The 2R counter has two modes of operation as controlled by signal XRMDO stored in latch 701. This bit is programmable via the microprocessor or data bus 11. When XRMDO is a logic high, counters 709 and 712 count as an 8-bit up-counter. The counters have a range of dividing factors between 2 and 257. The divide-by factor is controlled by the value stored in latches 705-708 via the microprocessor bus 11. The terminal count (TCN) from counters 709 and 712 are NORed by gate 702, then stored in flip-flop 710. The output of flip-flop 710 causes counter 709 to load the value in latches 705 and 706 and then start counting up from this preloaded value. The terminal count signals (TCN) from counters 709 and 712 are also ORed by gate 704 then stored by mux flip-flop 711. The output of flip-flop 711 causes the counter 712 to preload the value stored in latches 707 and 708. The terminal count TC from counter 709 drives the clock enable on counter 712. Thus, counter 712 only counts after counter 709 has reached its terminal count value thereby making an 8-bit counter out of two 4-bit counters. Mux flip-flops 710 and 711, besides pipe-lining the terminal counts to enable faster counting operation, also receive an input signal RESYNC. When this signal goes logic high, it causes the outputs of flip-flop 710 and 711 to go high and, thus, cause a preload on counters 709 and 712 immediately. The RESYNC signal also causes flip-flops 715 and 716 to go high. Thus, the 2RCP period is started over with the 2RCP at the beginning of the high state period. This feature allows the gate array to synchronize to an incoming data stream much faster than adjusting the divider circuit 15 output by one clock period. Gate 714 causes flip-flop 716 to toggle when both counters 709 and 712 reach the terminal count as determined by gate 704. Thus, the 2RCP is a 50% duty cycle output with the period of each half of the period controlled by the 8-bit counter with its latched preload value. Gate 713 causes flip-flop 715 to toggle when the counter 709 reaches a terminal count condition. This causes the signal XRCP from flip-flop 715 to also have a 50% duty cycle.

When the signal XRMDO is a logic zero the parallel load functions of counters 709 and 712 are independent. The parallel load function for counter 709 is determined only by the TCN signal from counter 709. However, the parallel load for counter 712 is still controlled by counters 709 and 712. This permits programming of the signal XRCP to be an exact multiple of, and synchronized with, the 2RCP signal. The multiple of the XRCP above the 2RCP is controlled by the preload value stored in counter 712. For example, if counter 712 is loaded with 1101, the XRCP will be 5 times the 2RCP rate. Gate 703 causes counter 712 to count on every clock period rather than when counter 709 reaches terminal count. This function is used for testing of the gate array.

Figure 8:
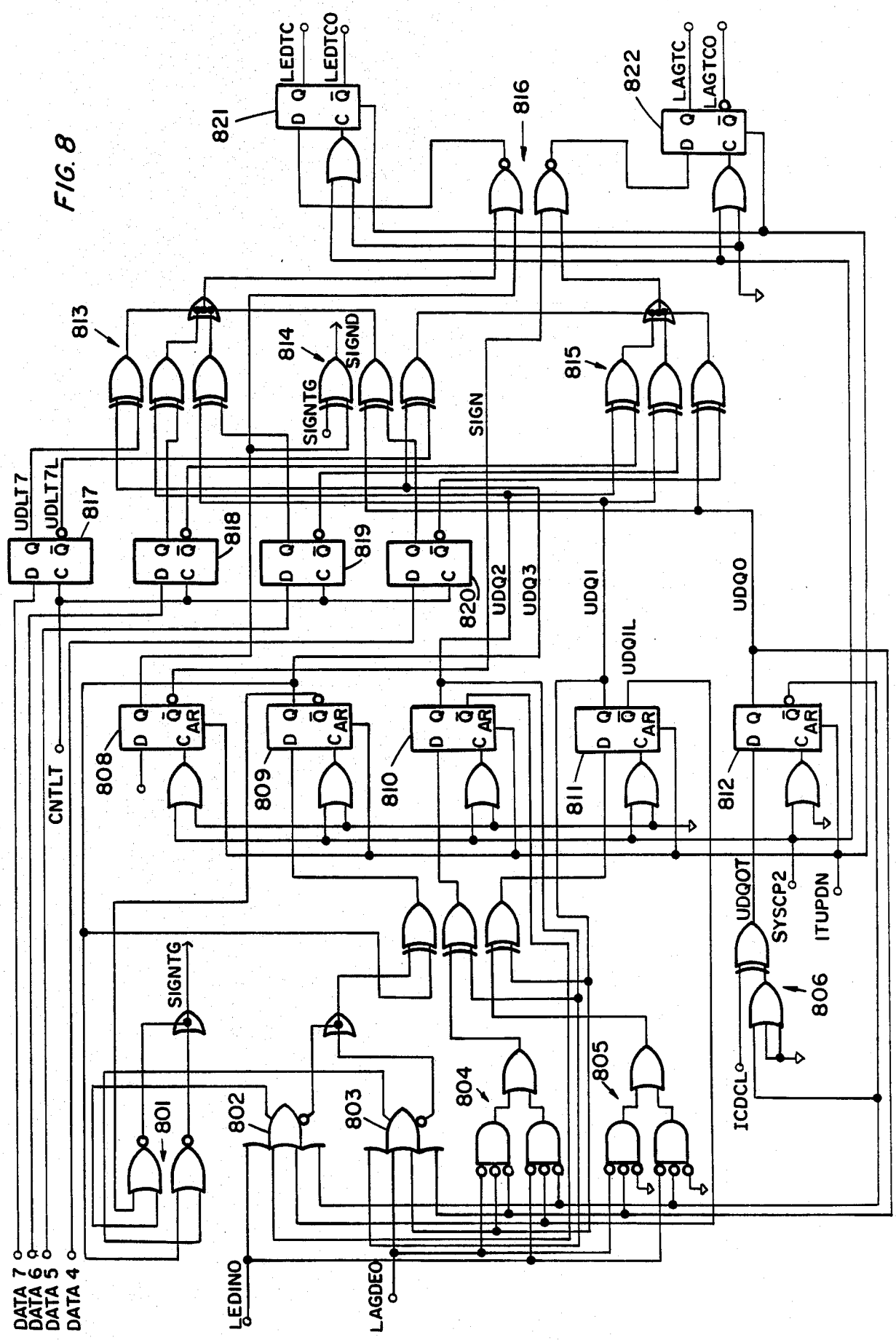
FIG. 8 is a block and logic diagram of the up/down counter circuit of the instant invention.

Referring now to FIG. 8, there is shown a logic block diagram of the up/down counter circuit. Combinational logic 801 through 807, along with flip-flops 808 through 812, provide the up/down counting function. The flip-flops 808 through 812 are initialized by the divider circuit 15 to a value of 16. Each time a LEDINO input pulse is received, the counter counts up one value from its present value. Each time a LAGDEO pulse is received, the counter counts down one from its present value. The counter has a range from 0 to 31. Combination logic 813 through 816 acts as a compare to match what is in the counter flip-flops 808 through 812 with the value stored in latches 817 through 820. The latches are loaded with a value for example, from 1 to 15 by the external microprocessor bus 11. Thus, if the latches contained the value 8 and the up/down counter counted 8 up from its unit value of 16 to 24, then the D-input of flip-flop 821 would go high. The output of flip-flop 821 would then go high indicating to the divider circuit that a lead terminal count condition (LEDTC) has occurred and it is time for the divider to shorten the divide period. With the same value of 8 in the latches 817 through 820 and if the counter counted down by 8+1 (i.e. to a value of 7), the D-input to flip-flop 822 would go high. The output of flip-flop 822 would then go high indicating to the divider circuit 15 that a lag terminal count (LAGTC) condition has occurred and the divide period should be lengthened by one.

Figure 9:
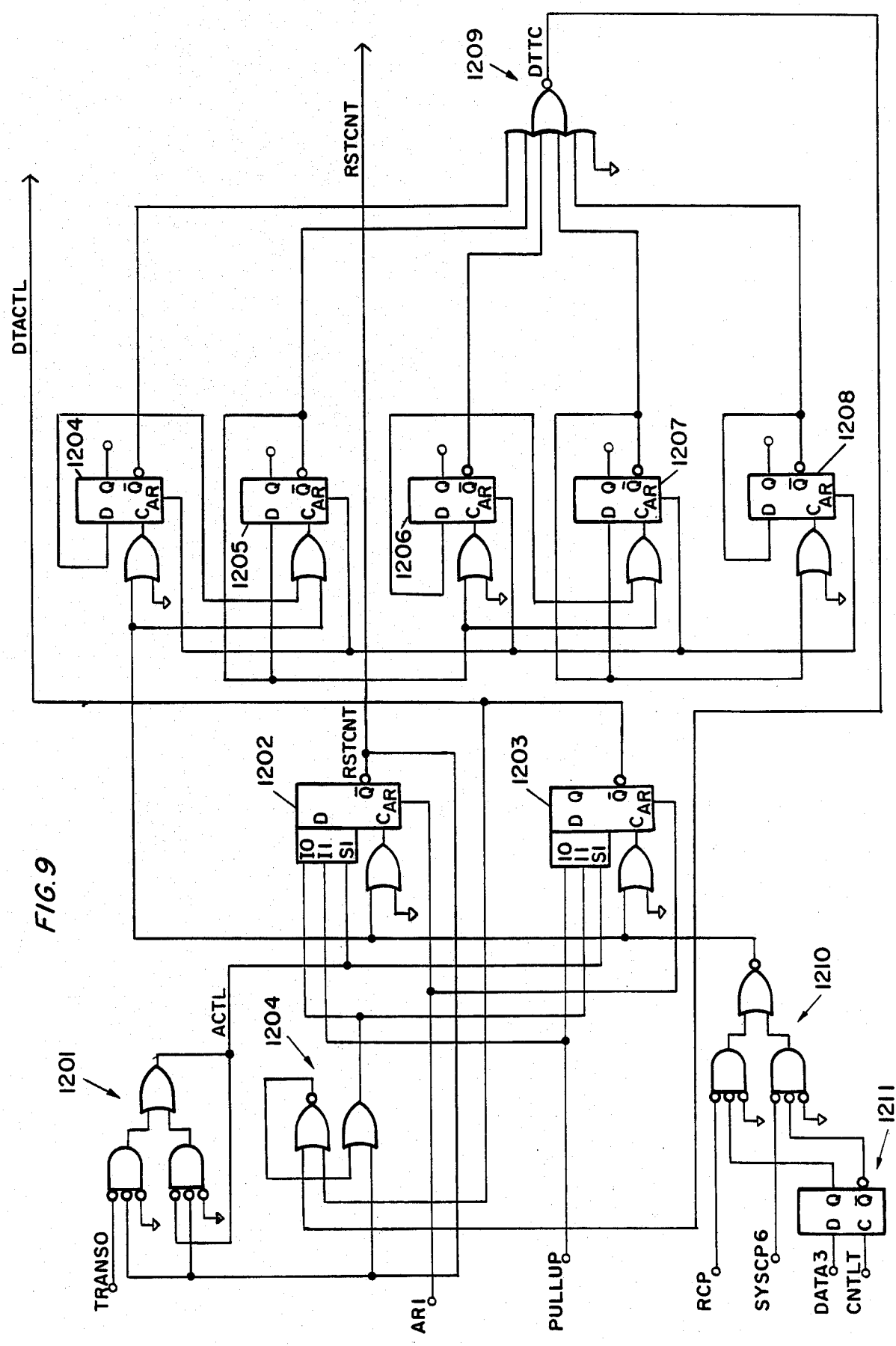
FIG. 9 is a block and logic diagram of the data activity circuit of the instant invention.

FIG. 9 shows a logic diagram of the data active monitoring circuitry which monitors transitions on the incoming video data stream. Gate 1201 latches low (ACTL) any time a video transition occurs (as indicated by signal TRANSO which is produced by the transition detector 17 of FIG. 1). Assuming that no data activity has occurred, flip-flop 1203 produces a logic high output DTACTL which is sent out of the gate array for system monitoring. Also the flip-flop 1202 output (RSTCNT) is low which allows counting by the ripple counter which consists of flip-flops 1204 through 1208 and gate 1209. When the ripple counter reaches a count of 31, gate 1209 will indicate a terminal count condition. If no data transitions have occurred, the ripple counter will roll over and count from 0 to 31 again. Any time a data transistion occurs, the output of flip-flop 1203 will go low indicating data activity. Also, flip-flop 1204 will pulse high for one clock period which starts the ripple counter over and resets the transition holding latch 1202. If no transition occurs before a terminal count is reached, the terminal count causes flip-flop 1203 to go high indicating no data activity. If a data transition occurs before the terminal count, flip-flop 1202 will reset the ripple counter and flip-flop 1203 will remain unchanged. Thus, so long as data transitions occur every 32 clock periods this circuitry will indicate data activity. The circuitry is normally clocked by the RCP through gate 1210. This clock rate is one half the data rate. Thus, the circuitry will indicate data activity so long as a data transition occurs within 64 data periods. Latch 1211 controls whether the RCP or the SYSCP6 clocks the data activity circuitry. The SYSCP6 clock is used only to speed up the gate array chip test and is not used in normal operation. The latch 1211 is programmed over the microprocessor bus 11.

Figure 10:
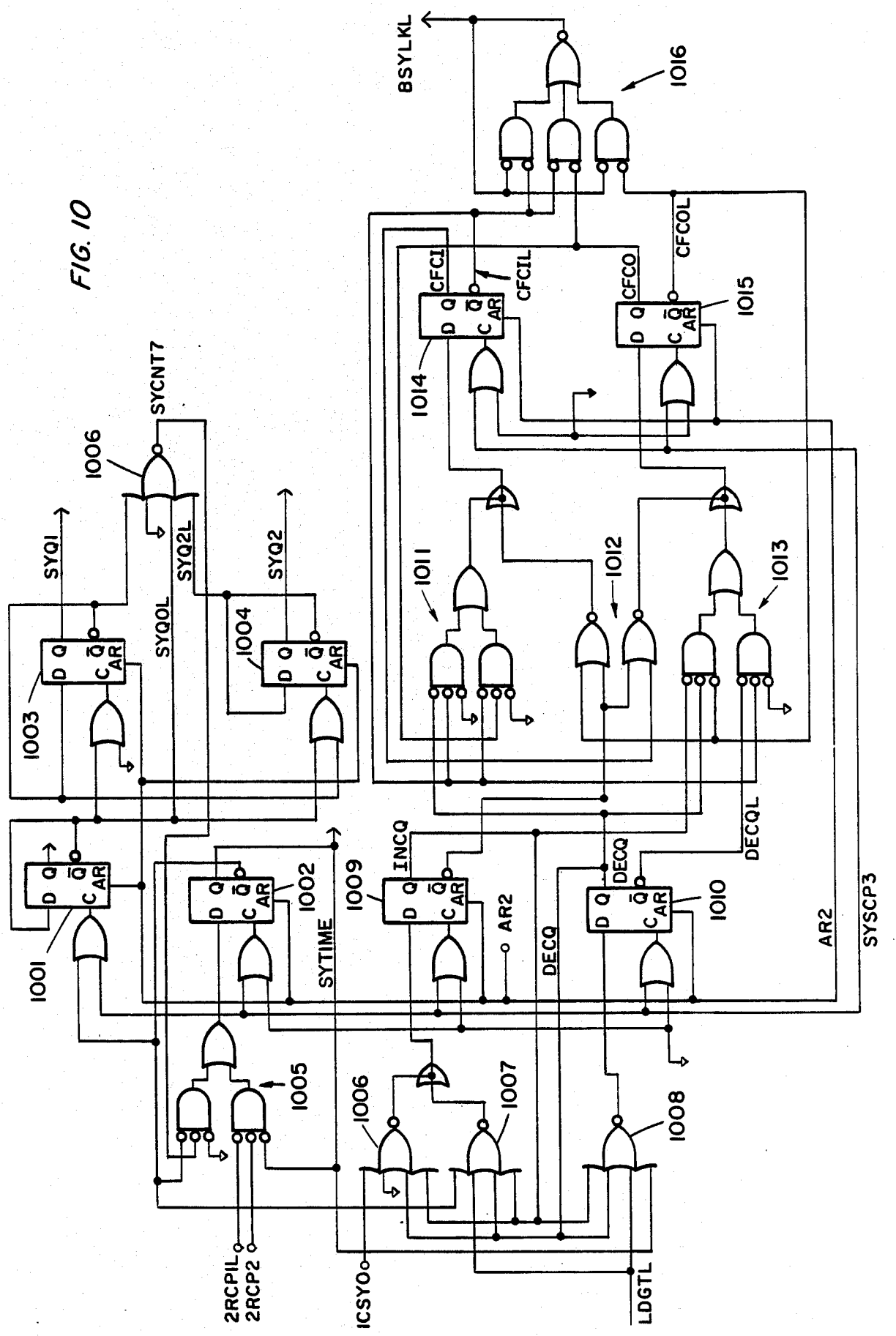
FIG. 10 is a block and logic diagram of the sync lock circuit of the instant invention.

Referring now to FIG. 10 there is shown a logic diagram of the sync lock circuitry which determines when the 2RCP rising transition is lined up with the video data transition. The sync lock circuitry consists of three sub-parts. Flip-flops 1001 through 1004 and combinational logic 1005 and 1006 provides a window comprising eight 8 clock periods around the rising edge of the 2RCP. This window includes four clock periods before and four clock periods after the rising edge of the 2RCP.

Combinational logic 1006 through 1008 together with flip-flops 1009 and 1010 determine if the lead or lag terminal counts (LDGTCL) produced by the up/down counter 18 are inside the eight clock period window or outside this window. If it is within the window, an increment signal (INCQ) is output from flip-flop 1009. Conversely, if LDGTCL is outside the window, flip-flop 1010 outputs a decrement signal (DECQ). Also, if the 2RCP signal is lined up within one clock period, an ICSYO signal is produced by transition detector 17. This will also cause flip-flop 1009 to output an INCQ signal. Combinational logic 1011 through 1013 together with flip-flops 1014 and 1015, acts as a four period up-/down counter which counts 0, 1, 3, and 2 for incrementing and 2, 3, 1, and 0 for decrementing. The INCQ signal from flip-flop 1009 and the DECQ signal from flip-flop 1010 control the direction of the up/down counter which operates as a confidence counter.

Combinational logic 1016 monitors the output of the confidence counter. If the counter is at 0, gate 1016 indicates an "out of bit sync lock" condition. Signal BSYLKL goes high in this example. When the counter reaches 2, logic 1016 indicates an "in bit sync lock" condition and signal BSYLKL goes low. Thus, the BSYLKL signal changes only when the confidence counter reaches either 0 or 2 at the terminal count values. These features allow the circuitry to indicate when the bit sync gate array is in bit sync lock so that an occasional video transition outside the window will not cause the system to go out of bit sync lock.

Referring now to FIG. 11 there is shown a logic diagram of the fast sync circuit. The function of this circuit is to allow for the rapid resynchronization of the bit sync when an "out of lock bit sync" condition occurs. This function is disabled when a low level signal DSLT is supplied via the microprocessor bus 11. When signal DSLT is high, the signal BSYLKL is allowed to go through gate 1101 as a high output which holds the ripple counter consisting of flip-flops 1103 through 1107 and logic gate 1108 through 1110 in the clear condition. When a bit sync loss occurs (BSYLKL goes logic high), the output of flip-flop 1102 goes low allowing the ripple counter to count. The output of flip-flop 1102, along with flip-flop 1111 and gate 1112 cause a resync signal (RESYNC) to go active high for one clock period.

The signal RESYNC causes the 2R counter to preload as previously described. This action causes the 2RCP to become aligned within 8 clock periods of the video transitions. Once a RESYNC signal has occurred, another RESYNC pulse is inhibited by the ripple counter. The ripple counter counts lead and lag terminal counts. The ripple counter will count 32 terminal counts and, if the system is still in an "out of bit sync lock" condition, another RESYNC pulse will be generated. Flip-flop 1113, combinational logic 1114, and gate 1115 combine and pipeline the lead and lag terminal counts which cause the ripple counter to count when it is not in a reset condition. The counting usually allows the bit sync to achieve a lock condition so that, normally, no new RESYNC pulses will occur.

Thus, there is shown and described a circuit or system for synchronizing information signal to a frequency signal and doing so with low jitter. The circuitry is especially adapted for gate array implementation. Other improvements provided by this invention include monitoring when the device has produced a clock signal which is synchronized to the incoming video signal, controlling fast synchronization of the clock with the incoming signal, and monitoring the incoming signal for data activity.

The new design permits the clock signal to be recovered from over 100,000 different signals. Various equations can be solved to show all the different frequencies that the circuit can lock onto and recover the clock from the input signal of that frequency. Likewise, in this system, the correction step size can be programmed and tailored to a drift in the incoming signal.

It is an important advantage to be able to simply program the data link system with multiple data rates to lock on. This provides a data link wherein adjustment of the frequency or a change in the data rate can be achieved. These and other unique improvements in the system described herein make it superior to the known designs.

The invention is described in terms of the overall system configuration and the respective circuit components thereof. The several descriptions are presented in order to provide a description of a preferred, working embodiment of the invention. The descriptions are not intended to be limitative of the invention. Rather, the descriptions are intended to be illustrative only. Those skilled in this art may conceive modification to this description. However, any such modifications which fall within the pruview of this description are intended to be included therein as well. The scope of the invention is limited only by the scope of the claims appended hereto.

We claim:

1. A synchronizer circuit comprising,
input means (VIDEO) for supplying input signals,
clock means (14) for supplying clock signals,
pre-scaler means (10) for receiving and altering the frequency of said clock signals from said clock means to produce scaled clock signals and return said scaled clock signals to said clock means,
control means (12) connected to said pre-scaler means to control the operation thereof,
divider circuit means (15) connected to receive said clock signals from said clock means and to divide said clock signals by selected division factors,
counter means (18) connected to receive the divided clock signals from said divider circuit means and to provide signals to said divider circuit means to selectively alter said division factors until synchronism is achieved between said input signals and said clock signals,
detector means (17) connected to said input means for detecting the presence of input signals and producing output signals which are supplied to said counter means and thereby control the operation of said divider circuit means, and
sync lock circuit means (20) connected to said clock means and said detector means and operative to indicate a synchronized condition between said input signals and said clock signals.

2. The synchronizer circuit recited in claim 1 wherein,
said clock means includes clock multiplexer (mux) means connected (14) to said control means to receive control signals therefrom and to selectively supply clock signals to said pre-scaler means.

3. The synchronizer circuit recited in claim 2 wherein,
said clock mux includes latch means connected to said control means and operative to select the mode of operation of said clock mux,
multiplexer means connected to receive and transmit one of a plurality of clock signals in response to the signals stored in said latch means, and
logic circuits connected to receive control signals from said pre-scaler means, said latch mean, said multiplexer, and said divider circuit means which control signals are representative of the conditions of these respective means and operative to produce a plurality of system clock signals.

4. The synchronizer circuit recited in claim 1 wherein,
said detector means includes transition detector means for detecting the presence of an input signal and producing signals which indicate whether said input signal leads or lags said clock signals.

5. The synchronizer circuit recited in claim 4 wherein,
said detector means includes data active circuit means connected to said transition detector means for detecting the presence of a transition at said input means and producing an output signal which indicates data activity.

6. The synchronizer circuit recited in claim 5 wherein,
said data active circuit includes logic circuitry connected to said transition detector to indicate a transition at said input means, and
ripple counter means which operates to count a preselected number of counts and produce an output signal which indicates no signal activity unless said logic circuitry produces a pulse which indicates a transtion at said input means prior to said ripple counter means reaching said preselected number of counts.

7. The synchronizer circuit recited in claim 4 wherein,
said transition detector means includes a plurality of serially connected flip-flop circuits connected to pass said input signals therethrough whereby a settled signal condition is assured.

8. The synchronizer circuit recited in claim 1 wherein,
said pre-scaler means comprises input latch circuit means connected to said control means to store information from said control means,
further counter means connected to said latch circuit means thereby to have a count value stored therein for counting clock signals from said clock means, and
pre-scaler output means for indicating when said further counter means has counted a prescribed number of clock signals.

9. The synchronizer circuit recited in claim 8 wherein,
said pre-scaler output means includes flip-flop means connected to pipeline the count condition of said further counter means.

10. The synchronizer circuit recited in claim 1 wherein;
said divider means includes input storage latches connected to said control means and adapted to store a prescribed division value,
a plurality of flip-flop means which are connected to said input storage latches in order to operate as a down counter, and to supply an enable signal to said clock means to control the operation thereof, and
logic circuit means connected between said input storage means and said plurality of flip-flop means to modify the division value stored in said input storage means in response to a lead or lag signal from said detector means.

11. The synchronizer circuit recited in claim 10 wherein,
said divider means further includes count storage means connected to said counter means to store a lead/lag count signal.

12. The synchronizer recited in claim 1 including,
master clock signal supplying means for supplying master clock signals to said clock means.

13. The synchronizer recited in claim 12 wherein,
said master clock signal supplying means provides a plurality of clock signals having different frequencies.

14. The synchronizer circuit recited in claim 1 wherein,
said counter means includes up/down counter means connected to receive signals from said detector means and to supply a lead signal or a lag signal to said divider means to indicate that the input signals respectively lead or lag the clock signals and to selectively alter the division factor of said divider means.

15. The synchronizer circuit recited in claim 1 wherein,
said control means includes a microprocessor controller and bus means.

16. The synchronizer recited in claim 1 including,
clock counter means (23) connected to receive clock signals from said clock means and control signals from said control means and operative to produce a synchronous clock signal with a divided-down representation of said clock signals.

17. The synchronizer circuit recited in claim 16 wherein,
said clock counter means includes preloaded counters and is connected to supply said divided-down clock signals to said pre-scaler means.

18. The synchronizer circuit recited in claim 17 wherein,
said clock counter means includes input latch storage means connected to receive signals from said control means thereby to determine the divided down factor, and
counting circuit means connected to said input latch storage means to count in accordance with said divided down factor.

19. The synchronizer circuit recited in claim 16 wherein,
said sync lock circuit means includes fast sync means for synchronizing said input signals and said clock signals by selectively supplying signals to said clock counter means.

* * * * *